US009552237B2

(12) United States Patent
Biesack (10) Patent No.: US 9,552,237 B2
(45) Date of Patent: Jan. 24, 2017

(54) API VALIDATION SYSTEM

(71) Applicant: SAS Institute Inc., Cary, NC (US)

(72) Inventor: David James Biesack, Fuquay-Varina, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 14/836,428

(22) Filed: Aug. 26, 2015

(65) Prior Publication Data

US 2016/0147578 A1 May 26, 2016

Related U.S. Application Data (60) Provisional application No. 62/084,934, filed on Nov. 26, 2014.

(51) Int. Cl.
*G06F 9/54* (2006.01)
*H04L 29/08* (2006.01)

(52) U.S. Cl.
CPC ............... *G06F 9/541* (2013.01); *H04L 67/02* (2013.01)

(58) Field of Classification Search
CPC ................................. G06F 9/541; H04L 67/02
USPC ......................................................... 719/328
See application file for complete search history.

(56) References Cited

U.S. PATENT DOCUMENTS

| 2010/0010960 A1* | 1/2010 | Singh | ............... G06F 17/30498 707/E17.005 |
| 2014/0068047 A1* | 3/2014 | Williams | ............ H04L 41/5077 709/223 |

OTHER PUBLICATIONS

Frisby.js; archived Aug. 14, 2013; 7 pages.*
Best way to read JSON from file for expectJSON parameter?; Jan 3, 2014; https://github.com/vlucas/frisby/issues/61; 2 pages.*
Francois Lascelles; JSON schema validation for RESTful web services; Jan. 18, 2010; 4 pages.*
David Biesack; Uniform REST API Validation Language (UnRAVL)—a JSON domain-specific language for validating REST APIs; 2015; 17 pages.*
JSON, Downloaded from http://en.wikipedia.org/wiki/JSON on Dec. 18, 2014, pp. 1-9.
RAML (software), Downloaded from http://en.wikipedia.org/wiki/RAML_(software) on Dec. 18, 2014, pp. 1-6.

* cited by examiner

*Primary Examiner* — Andy Ho
*Assistant Examiner* — Kimberly Jordan
(74) *Attorney, Agent, or Firm* — Bell & Manning, LLC (57) ABSTRACT

A system that validates an application programming interface (API) call is provided. A key and a value associated with the key are read from a test script containing a script. The key and the value are separated by a colon. The key is included in first double quotes, and the value is included in second double quotes. Whether the key matches a plurality of keys defined for an API call is determined. Based on the key matching the plurality of keys defined for the API call, the API call is configured using the key and the value without any of the colon, the first double quotes, or the second double quotes. The configured API call is executed.

30 Claims, 4 Drawing Sheets

API VALIDATION SYSTEM

CROSS-REFERENCE TO RELATED APPLICATIONS

The present application claims the benefit of 35 U.S.C. §119(e) to U.S. Provisional Patent Application No. 62/084,934 filed Nov. 26, 2014, the entire contents of which are hereby incorporated by reference.

BACKGROUND

An application programming interface (API) connects a computer program to a programming library. Representational state transfer (REST) is a software architecture style consisting of guidelines and best practices for creating scalable Web services. REST is a coordinated set of constraints applied to the design of components of the Web services. REST is recognized as a simpler alternative to the simple object access protocol and to Web services description language based Web services. RESTful systems communicate using the hypertext transfer protocol (HTTP) with the same HTTP verbs (GET, POST, PUT, DELETE, etc.) used by web browsers to retrieve web pages and send data to remote servers.

SUMMARY

In an example embodiment, a computer-readable medium that validates an application programming interface (API) call is provided. A key and a value associated with the key are read from a test script containing a script. The key and the value are separated by a colon. The key is included in first double quotes, and the value is included in second double quotes. Whether the key matches a plurality of keys defined for an API call is determined. Based on the key matching the plurality of keys defined for the API call, the API call is configured using the key and the value without any of the colon, the first double quotes, or the second double quotes. The configured API call is executed.

In another example embodiment, a system is provided. The system includes, but is not limited to, a processor and a computer-readable medium operably coupled to the processor. The computer-readable medium has instructions stored thereon that, when executed by the processor, cause the system to validate an API call.

In yet another example embodiment, a method of validating an API call is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

REST APIs are network APIs that organizations publish to allow diverse clients, such as mobile applications, to integrate with the organizations software services and content. Many commonly-used applications work using REST APIs as understood by a person of skill in the art. A REST API call includes an HTTP verb (e.g., GET, POST, PUT, DELETE, HEAD, PATCH), a uniform resource locator (URL) of a resource, an optional request body (data or content to pass to the API), and HTTP headers that provide options or parameters for the API call. The REST API call returns an integer HTTP status code, an optional response body that includes the content of the request result, and optional response HTTP headers that describe the response.

For example, Google® provides an elevation REST API that returns the elevation in meters of any point on the surface of the Earth. The REST API call is GET http://maps.googleapis.com/maps/api/elevation/json?locations=27.988056,86.925278&sensor=false.

The REST API call invokes the API and passes a location in the form of latitude and longitude. The REST API call returns an HTTP status of 200 and a request body that contains the result encoded in JavaScript object notation (JSON). For example, the output of the call is:

```
{
   "results" : [
   {
      "elevation" : 8815.7158203125,
      "location" : {
         "lat" : 27.988056,
         "lng" : 86.92527800000001
      },
      "resolution" : 152.7032318115234
   }
   ],
   "status" : "OK"
}
```

JavaScript object notation (JSON) is an open standard data-interchange format that uses human-readable text to transmit data objects consisting of attribute-value pairs. JSON is used primarily to transmit data between a server and a web application and as an alternative to XML. Although originally derived from the JavaScript scripting language, JSON is a language-independent data format. Code for parsing and generating JSON data is readily available in many programming languages. JSON is also easy for machines to parse and generate.

JSON is built on two structures: 1) a collection of name/value pairs, and 2) an ordered list of values. In various languages, the collection of name/value pairs is realized as an object, record, struct, dictionary, hash table, keyed list, or associative array. In most languages, the ordered list of values is realized as an array, vector, list, or sequence. These are universal data structures. Virtually all modern programming languages support them in one form or another.

In JSON, an object is an unordered set of name/value pairs. An object begins with a left brace ("{") and ends with a right brace ("}"). Each name is followed by a colon (":") and the name/value pairs are separated by a comma (",") in the form {string:value, string:value, . . . string:value}.

In JSON, an array is an ordered collection of values. An array begins with a left bracket ("[") and ends with a right bracket ("]") and values are separated by a comma (",") in the form [value, value, . . . value].

In JSON, a value can be a string in double quotes, a number, true or false, NULL, an object, or an array. These structures can be nested. In JSON, a string is a sequence of zero or more Unicode characters wrapped in double quotes using backslash escapes. In JSON, a character is represented as a single character string. In JSON, a number is very much like a C or Java number, except that the octal and hexadecimal formats are not used. In JSON, whitespace can be inserted between any pair of tokens.

Figure 1:
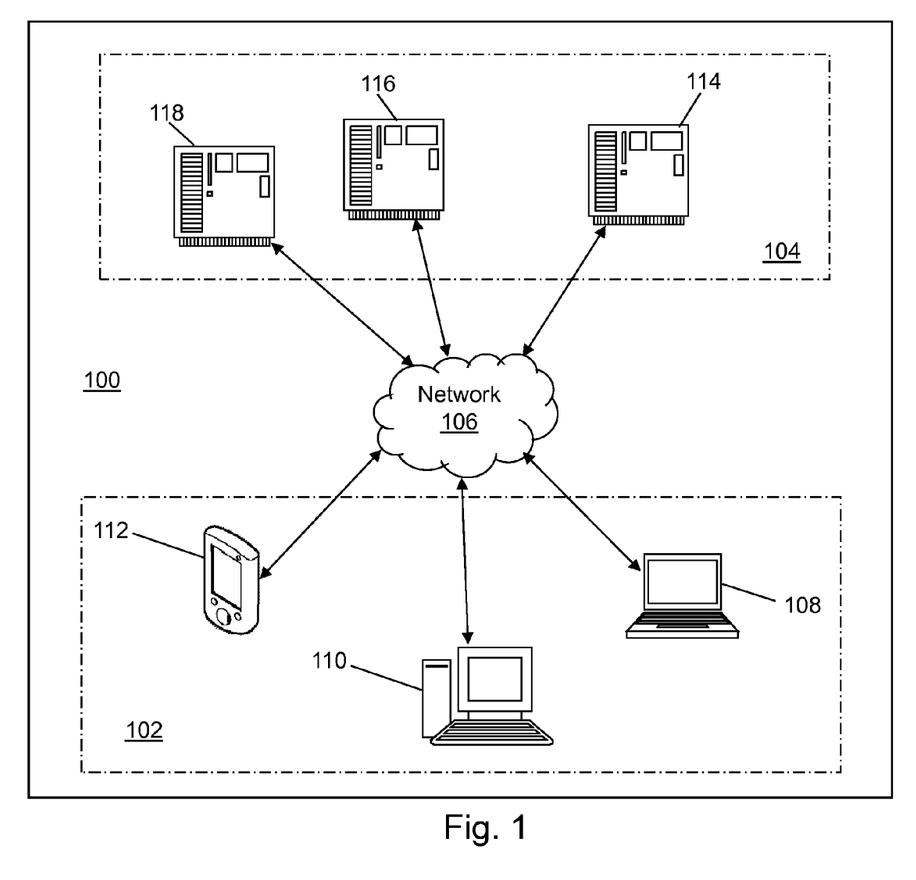
FIG. 1 depicts a block diagram of an API validation system in accordance with an illustrative embodiment.

Referring to FIG. 1, a block diagram of an API validation system 100 is shown in accordance with an illustrative embodiment. For example, API validation system 100 may be used to test or validate a REST API. In an illustrative embodiment, API validation system 100 may include API validator systems 102, API implementer systems 104, and a network 106. The API implementer systems 104 implement the API under test such as the REST API. API validator systems 102 test and validate the API implemented by the API implementer systems 104.

The components of API validation system 100 may be included in a single computing device, may be located in a single room or adjacent rooms, in a single facility, and/or may be distributed geographically from one another. Additionally, each of the API validator systems 102 and the API implementer systems 104 may be composed of one or more discrete devices.

Network 106 may include one or more networks of the same or different types. Network 106 can be any type of wired and/or wireless public or private network including a cellular network, a local area network, a wide area network such as the Internet, etc. Network 106 further may comprise sub-networks and consist of any number of devices.

API validator systems 102 can include any type of computing device. The computing device sends and receives signals through network 106 to/from API implementer systems 104. The one or more computing devices of the API validator systems 102 may include computers of any form factor such as a laptop 108, a desktop 110, a smart phone 112, a personal digital assistant, an integrated messaging device, a tablet computer, etc. API validator systems 102 may communicate using various transmission media that may be wired and/or wireless as understood by those skilled in the art.

The one or more computing devices of the API implementer systems 104 may include computers of any form factor such as a laptop, a desktop, a smart phone, a personal digital assistant, an integrated messaging device, a tablet computer, etc. For illustration, FIG. 1 represents the API implementer systems 104 with a first server computer 114, a second server computer 116, and a third server computer 118. The API implementer systems 104 can include any number and any combination of form factors of computing devices that may be organized into subnets. The one or more computing devices of the API implementer systems 104 may communicate using various transmission media that may be wired and/or wireless as understood by those skilled in the art. The one or more computing devices of the API implementer systems 104 may send and receive signals through network 106 to/from other computing devices of the API implementer systems 104 and/or to/from one or more computing devices of the API validator systems 102.

Testing or validating a REST API typically uses software that can express the REST API calls, capture the result from the calls, and validate the results against expected values. Such validation can be done in many different programming languages using a variety of libraries for performing HTTP network calls, parsing results, and performing comparisons. In most cases, the software that invokes the test calls is obscured by the programming language syntax and code structure used to construct the inputs, invoke the REST API calls, capture and parse the output, and process or validate the output. The intent and behavior of such tests may be complicated because the test data, which often uses JSON, cannot be expressed directly in the programming language, so such data must be constructed from numerous operations or steps in the programming language, or stored in external data files.

Figure 2:
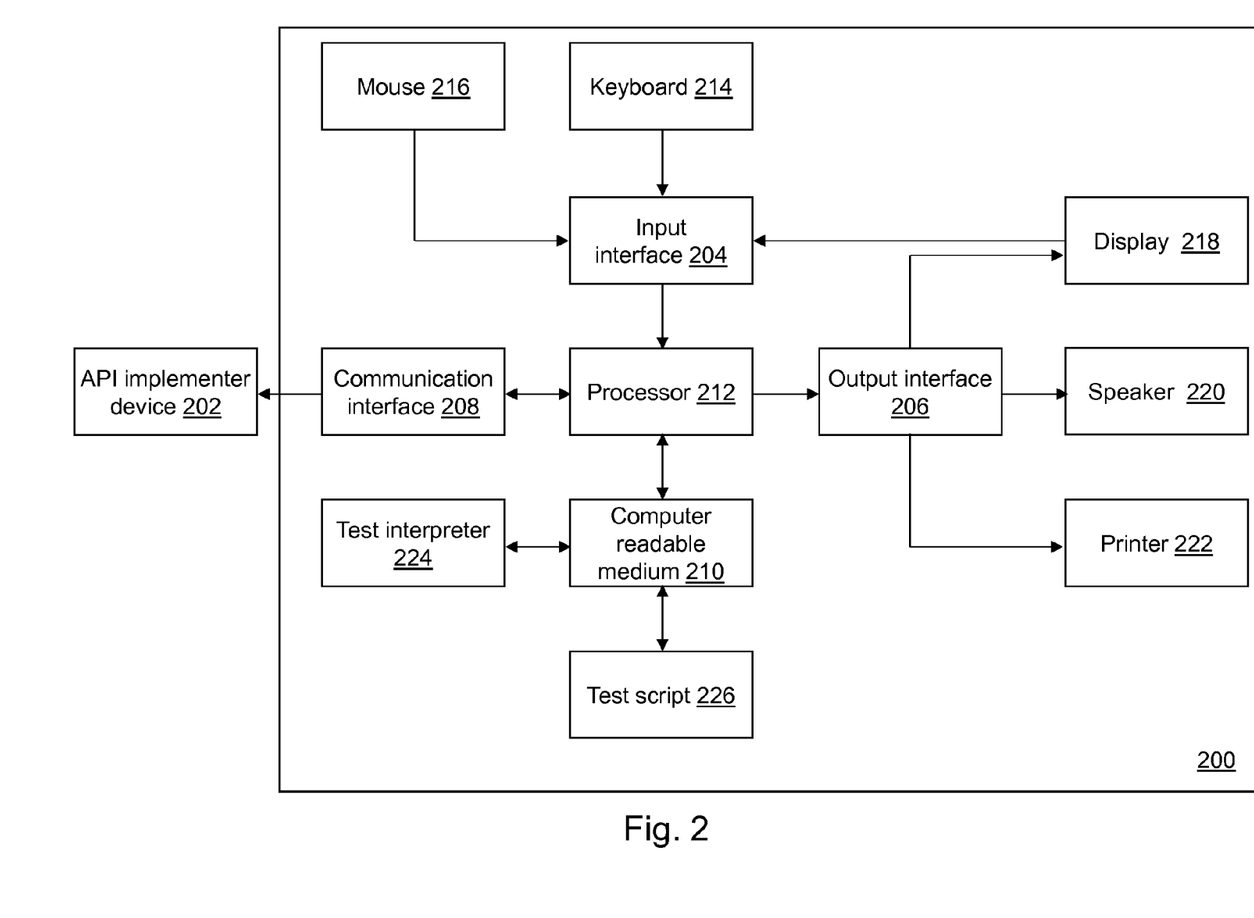
FIG. 2 depicts a block diagram of a API validator device of the API validation system of FIG. 1 in accordance with an illustrative embodiment.

Referring to FIG. 2, a block diagram of an API validator device 200 of the API validator systems 102 is shown in accordance with an illustrative embodiment. API validator device 200 is an example computing device of the API validator systems 102. In the illustrative embodiment, of FIG. 2, API validator device 200 is connected to communicate with an API implementer device 202 to test the API implemented by API implementer device 202. API implementer device 202 is an example computing device of the API implementer systems 104.

API validator device 200 may include an input interface 204, an output interface 206, a communication interface 208, a computer-readable medium 210, a processor 212, a keyboard 214, a mouse 216, a display 218, a speaker 220, a printer 222, a test interpreter 224, and a test script 226. Fewer, different, and additional components may be incorporated into API validator device 200.

Input interface 204 provides an interface for receiving information from the user for entry into API validator device 200 as understood by those skilled in the art. Input interface 204 may interface with various input technologies including, but not limited to, keyboard 214, mouse 216, display 218, a track ball, a keypad, one or more buttons, etc. to allow the user to enter information into API validator device 200 or to make selections presented in a user interface displayed on display 218. The same interface may support both input interface 204 and output interface 206. For example, a display comprising a touch screen both allows user input and presents output to the user. API validator device 200 may have one or more input interfaces that use the same or a different input interface technology. The input interface technology further may be accessible by API validator device 200 through communication interface 208.

Output interface 206 provides an interface for outputting information for review by a user of API validator device 200. For example, output interface 206 may interface with various output technologies including, but not limited to, display 218, speaker 220, printer 222, etc. API validator device 200 may have one or more output interfaces that use the same or a different interface technology. The output interface technology further may be accessible by API validator device 200 through communication interface 208.

Communication interface 208 provides an interface for receiving and transmitting data between devices using various protocols, transmission technologies, and media as understood by those skilled in the art. Communication interface 208 may support communication using various transmission media that may be wired and/or wireless. API validator device 200 may have one or more communication interfaces that use the same or a different communication interface technology. For example, API validator device 200 may support communication using an Ethernet port, a Bluetooth antenna, a telephone jack, a USB port, etc. Data and messages may be transferred between API validator device 200 and API implementer systems 104 using communication interface 208.

Computer-readable medium 210 is an electronic holding place or storage for information so the information can be accessed by processor 212 as understood by those skilled in the art. Computer-readable medium 210 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. API validator device 200 may have one or more computer-readable media that use the same or a different memory media technology. API validator device 200 also may have one or more drives that support the loading of a memory media such as a CD or DVD, an external hard drive, etc. One or more external hard drives further may be connected to graphic design device 100 using communication interface 106.

Processor 212 executes instructions as understood by those skilled in the art. The instructions may be carried out by a special purpose computer, logic circuits, or hardware circuits. Processor 212 may be implemented in hardware and/or firmware. Processor 212 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 212 operably couples with input interface 204, with output interface 206, with communication interface 208, and with computer-readable medium 210 to receive, to send, and to process information. Processor 212 may retrieve a set of instructions from a permanent memory device and copy the instructions in an executable form to a temporary memory device that is generally some form of RAM. API validator device 200 may include a plurality of processors that use the same or a different processing technology.

Test interpreter 224 performs operations associated with testing or validating an API, such as the REST API, implemented, for example, by API implementer device 202. For example, test interpreter 224 expresses the variety of REST API calls, captures the result from the calls, and validates the results against expected values by interpreting test script 226. Some or all of the operations described herein may be embodied in test interpreter 224. The operations may be implemented using hardware, firmware, software, or any combination of these methods. Referring to the example embodiment of FIG. 2, test interpreter 224 is implemented in software (comprised of computer-readable and/or computer-executable instructions) stored in computer-readable medium 210 and accessible by processor 212 for execution of the instructions that embody the operations of test interpreter 224. Test interpreter 224 may be written using one or more programming languages, assembly languages, scripting languages, etc. For illustration, test interpreter 224 may be implemented as a Java program. For example, test interpreter 224 may include a parser that parses test script 226, and an interpreter that transforms test script 226 into machine-readable code during execution of test script 226. A parser is a software component that takes input data and builds a data structure giving a structural representation of the input and checking for correct syntax. Test interpreter 224 further may include one or more plug-ins (add-ins, extensions, or add-ons), where a plug-in is a software component that adds a specific feature to an existing software application. Test interpreter 224 may be designed to interpret a domain specific language such as a language structured to test or validate a REST API.

Test script 226 is implemented using a concise notation for specifying the inputs to one or more REST API calls and capturing the output, without cumbersome programming language "boilerplate" that obscures the intent of the REST API test. The concise notation accelerates testing of REST APIs. Test script 226 uses JSON, which allows REST API input to be expressed directly, rather than requiring such content to be stored in separate external files or embedded in test script notation using awkward quoting notations. Being strictly JSON, test script 226 can automatically generate tests from various REST specifications such as those based on the RESTful API modeling language developed by the RAML Workgroup or Swagger offered by Reverb Technologies, Inc. of Palo Alto, Calif., USA. Test script 226 is implemented to support prototype inheritance of testware for easier reuse and more concise tests of the REST API. Testers do not have to learn programming to test REST APIs.

Referring to FIGS. 3a-3d, example operations associated with test interpreter 224 are described. Additional, fewer, or different operations may be performed depending on the embodiment. The order of presentation of the operations of FIGS. 3a-3d is not intended to be limiting. Although some of the operational flows are presented in sequence, the various operations may be performed in various repetitions, concurrently, and/or in other orders than those that are illustrated. As further understood by a person of skill in the art, various operations may be performed in parallel, for example, using a plurality of threads.

Figure 3A:
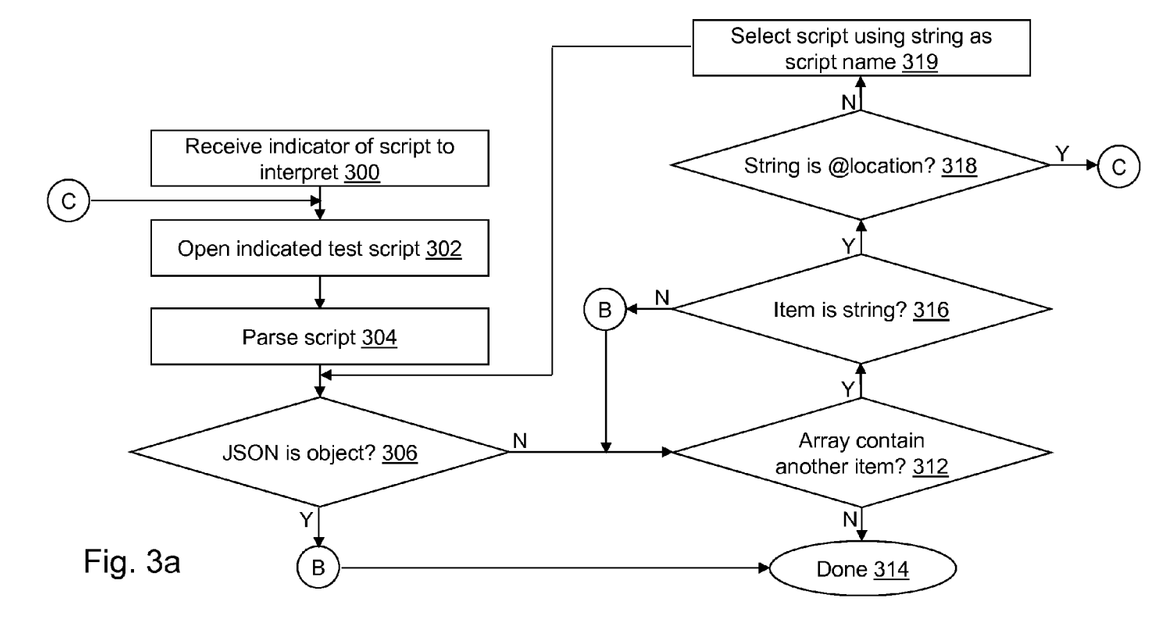
FIGS. 3a, 3b, 3c, and 3d depict a flow diagram illustrating examples of operations performed by the API validator of the API validation system of FIG. 1 in accordance with an illustrative embodiment.

Referring to FIG. 3a, in an operation 300, an indicator is received indicating a script to interpret. For example, a script name may be included on a command line that triggers execution of test interpreter 224 with test script 226. In an operation 302, the indicated script is opened. In an operation 304, the opened script is parsed. For example, test script 226 may be written to follow the syntactic rules of a domain-specific language specific to validating REST APIs. Test script 226 may be coded in JSON such that test script 226 includes a JSON description of a REST API call that is expressed as a JSON object structure.

For example, each script object parsed from test script 226 may be a JSON object that consists of one or more named values in the form "'key':value" defined as the key/value pair. The values may be a JSON object, an array, or a string. The following keys in Table I may be recognized by test interpreter 224:

TABLE I

| key | Value specification |
| --- | --- |
| name | Script name use to identify the script for invocation by a subsequent script |
| template | The name of a script to merge into the current script |
| env | A JSON object of named values where each value is bound in the environment using the name associated with it |
| preconditions | Asserted conditions evaluated for truth before making an API call |
| auth | REST API authentication parameters |
| GET PUT POST HEAD PATCH DELETE | API call - target URL for selected HTTP verb |
| headers | Names and values of HTTP headers |
| body | Request body |
| bind | Variables to which response values from the API call are stored |
| assert | Response values evaluated for truth after making an API call |

In an operation 306, a determination is made concerning whether or not the parsed result is a JSON object. If the parsed result is a JSON object, processing continues in an operation 308 shown referring to FIG. 3b. After returning from the operations of FIG. 3b, processing is complete in an operation 314. If the parsed result is not a JSON object, processing continues in an operation 312.

For example, if the parsed result is a JSON object, test interpreter 224 may treat the parsed result as a single script object. If the parsed result is a JSON array, test interpreter 224 may treat the parsed result as an array of script objects. For example, test script 226 may include one or more script objects. Each script object may be a JSON object or a string. A string may be treated as a name of a previously parsed script object, unless the string begins with a special character such as an "@" character. If the string begins with the special character, the corresponding script object is read from the file or URL that is named after the @ character.

For example, below is an illustrative test script 226 that contains an array of three script objects.

```
[
  { "name" : "GET_support_ticket",
    "GET" : ...
  },
  "GET_support_ticket",
  "@http://{script.server}/scripts/test-32.json"
]
```

A first member, "name": "GET_support_ticket", is a nested script named "GET_support_ticket" with its body, "GET": . . . , most of which is omitted for simplicity. A second member, "GET_support_ticket", is a simple string, which is the name of the nested script. Test interpreter 224 runs the nested script, "GET_support_ticket", a second time when it executes the second element. The third member is an @ string, "@http://{script.server}/scripts/test-32.json". Test interpreter 224 reads a script from the specified URI location, http://{script.server}/scripts/test-32.json and parses and executes the read script as another test script 226.

Each script included in test script 226 can have a "name" key and a "template" key. The "name" key defines the name of the script. If the name ends with the suffix ".template", the script defines a template. The "template" key is used to reference an existing template from test script 226 to reuse the "env", "preconditions", "headers" and other elements of the defined template. Many scripts can reference the same template, resulting in a large degree of reuse instead of copying those elements into each script.

Figure 3B:
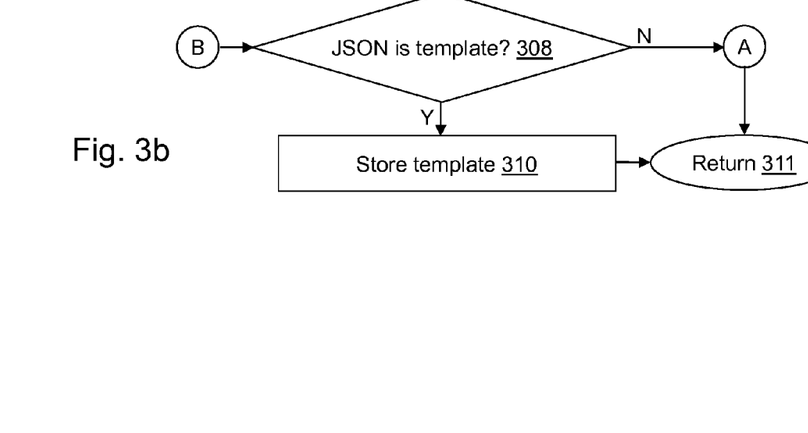

Referring to FIG. 3b, in operation 308, a determination is made concerning whether or not the JSON object's name indicates it is a template (e.g. name ends with ".template"). If the JSON object's name indicates it is a template, processing continues in an operation 310. If the JSON object's name does not indicate it is a template, processing continues in an operation 320 shown referring to FIG. 3c. After returning from the operations of FIG. 3c, processing is returned to the calling location in an operation 311. In operation 310, the template is stored and processing is returned to the calling location in operation 311.

Referring again to FIG. 3a, in operation 312, a determination is made concerning whether or not the array contains another item. If the array contains another item, processing continues in an operation 316. If the array does not contain another item, processing is complete in operation 314.

In operation 316, a determination is made concerning whether or not the item is a string. If the item is a string, processing continues in an operation 318. If the item is not a string, processing continues in operation 308 shown referring again to FIG. 3b. After returning from the operations of FIG. 3b, processing continues in operation 312 to process any remaining array items.

Referring again to FIG. 3a, in operation 318, a determination is made concerning whether or not the string is an @location. If the string is an @location, processing continues in operation 302. If the string is not an @location, processing continues in an operation 319.

In operation 319, a script is selected based on the string and processing continues in operation 306. For example, a previously parsed script object is identified based on the string matching the name of the previously parsed script object.

Figures 3C, 3D:
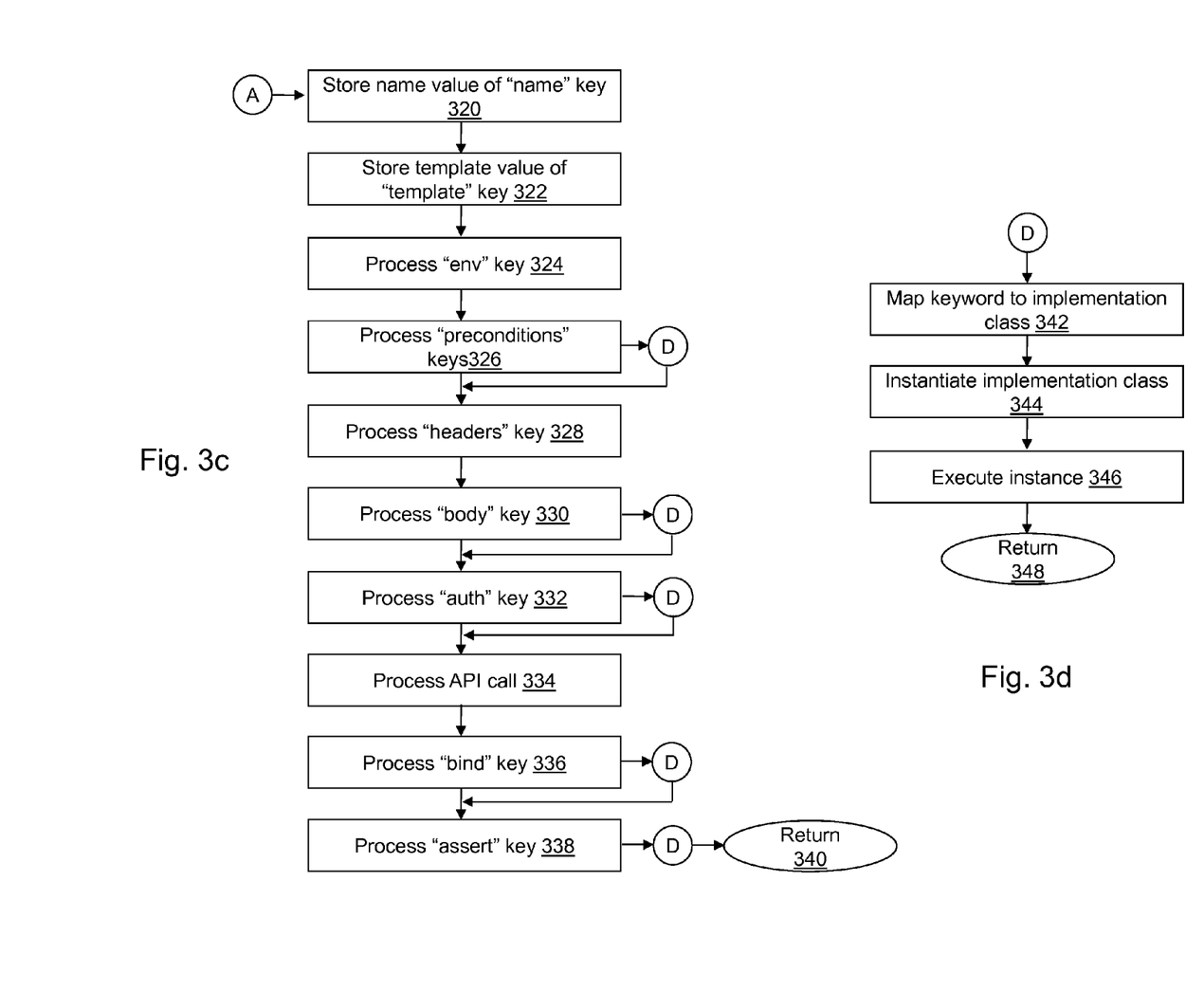

Referring to FIG. 3c, in operation 320, a name value associated with a "name" key is stored if any are included in test script 226. In an operation 322, a template value associated with a "template" key is stored if any are included in test script 226.

In an operation 324, an environment parameter associated with an "env" key is processed if any are included in test script 226. The environment parameter may include one or more items. If test script 226 contains a "template" key, the environment parameter associated with the "env" key of the named template is also processed.

In an operation 326, a preconditions parameter associated with a "preconditions" key is processed if any are included in test script 226. If the script contains a "template" key, the preconditions parameter associated with the "precondition" key of the named template is also processed. The preconditions parameter may include one or more preconditions items. For example, preconditions parameter may be an array of preconditions items. For each preconditions item, operations 342, 344, 346, and 348 (referring to FIG. 3d) are performed, and processing continues in an operation 328 after all of the preconditions items are processed. In operation 342, a keyword is mapped to an implementation class. For example, test interpreter 224 looks up a Java implementation class that has been registered with the key. The registration may occur when test interpreter 224 initializes. The association may be defined with one of several Java annotations for plug-in classes. For example, a com.sas.unravl.assertions.BoundAssertion class uses an @UnRAVLAssertionPlugin annotation:

@UnRAVLAssertionPlugin({"bound", "bound"})
public class BoundAssertion extends BaseAssertion Below is an example if a "preconditions" element that tests that the variables named "created" and "updated" have been bound in the environment:

```
{
  "preconditions" : { "bound" : [ "created", "updated" ] }
}
```

If the values are bound, the precondition is true. This precondition uses the registered key, "bound". Test interpreter 224 uses the logic defined in the implementation, class com.sas.unravl.assertions.BoundAssertion.

In operation 344, the implementation class is instantiated. In operation 346, the instantiated implementation class is executed. For example, a call of an associated method of the identified implementation class is made based on a second key. There may be one method per implementation class. Using the example above and the precondition "bound", the key "bound" maps to the implementation class com.sas.unravl.assertions.BoundAssertion. The class is instantiated and test interpreter 224 calls a check method of the instance of the implementation class, passing it the current script and the value associated with the key. In this case, the value is the array "["created", "updated" ]". The check method tests each value in the array to see if it is bound within the context of the current script. If any value in the array is not bound, the assertion (precondition) fails, and test interpreter 224 stops the processing of test script 226.

A method in object-oriented programming is a procedure associated with an object class that provides the interface that other classes use to access and modify the data properties of an object. For example, each of the keys used in "preconditions", "auth", "body", "bind", and "assert" elements may have a corresponding Java interface that performs a specific function for that key. As an example, the keys used in "preconditions" and "assert" elements (such as "bound") may implement a "com.sas.unravl.assertions.Assertion" (for example, in the class com.sas.unravl.assertions.BoundAssertion) interface which includes the method public void check(TestScript script, ObjectNode assertion, Stage stage, ApiCall call)

throws Assertion Exception, Exception;

In operation 348, processing continues at a next operation after the operation that called operation 342.

In an operation 328, a headers parameter associated with a "headers" key is processed if any are included in test script 226. The headers parameter may include one or more items. If the script contains a "template" key, the headers parameter associated with the "headers" key of the template is also processed.

In an operation 330, a body parameter associated with a "body" key is processed if included in test script 226. The body parameter may be included from a stored template value. Operations 342, 344, 346, and 348 (referring to FIG. 3*d*) are performed for the body parameter, and processing continues in an operation 332.

In operation 332, an authentication parameter associated with an "auth" key is processed if included in test script 226. The authentication parameter may be included from a stored template value. Operations 342, 344, 346, and 348 (referring to FIG. 3*d*) are performed for the authentication parameter, and processing continues in an operation 334.

In operation 334, an API call is processed. The API key may be included from a stored template value. For example the API call is configured based on the key and using the value as the API URL, and the configured API call is executed. For example, the key/value pair "GET": "http://maps.googleapis.com/maps/api/elevation/json?locations=27.988056,86.925278 &sensor=false" may be executed as the REST API call GET http://maps.googleapis.com/maps/api/elevation/json?locations=27.988056,86.925278 &sensor-false.

In an operation 336, a bind parameter associated with a "bind" key is processed if any are included in test script 226. If the script contains a "template" key, the bind parameter associated with the "bind" key of the template is also processed. The bind parameter may include one or more bind items. For example, bind parameter may be an array of bind items. For each bind item, operations 342, 344, 346, and 348 (referring to FIG. 3*d*) are performed, and processing continues in an operation 338 after all of the bind items are processed.

In operation 338, an assert parameter associated with an "assert" key is processed if any are included in test script 226. If the script contains a "template" key, the assert parameter associated with the "assert" key of the template is also processed. The assert parameter may include one or more assert items. For example, assert parameter may be an array of assert items. For each assert item, operations 342, 344, 346, and 348 (referring to FIG. 3*d*) are performed, and processing continues in an operation 340 after all of the bind items are processed.

For illustration, a key/value pair may be "assert": [{"headers": {"Location": "http://www.example.com/some/path/item"} } ], which is implemented by looking up a Java class that is associated with the key "headers" (com.sas.unravl.assertions.HeadersAssertion), and its check method is called with the JSON object, {"Location": "http://www.example.com/some/path/item"} as the method parameter ObjectNode assertion. The structure of the value associated with each such key is determined by the implementation class, not by test interpreter 224. Test interpreter 224 simply passes the corresponding JSON value to the implementation class, which allows new implementation classes to be added to add new behavior, without changing test interpreter 224. The associated, parsed response from the executed API call is compared to expected response results, and a result of the comparison such as successful or failed may be provided to a user such as on display 218.

In operation 340, processing continues at a next operation after the operation that called operation 320.

An example test script to test the Google REST API call GET http://maps.googleapis.com/maps/api/elevation/json?locations=27.988056,86.925278&sensor=false is:

```
{
  "GET" :
"http://maps.googleapis.com/maps/api/elevation/json?locations=
27.988056,86.925278&sensor=false",
  "assert": [
  { "status" : 200 },
  { "json" :
  {"results" : [ { "elevation" : 8815.7158203125, "location" :
      { "lat" : 27.988056, "lng" : 86.92527800000001
    },
    "resolution" : 152.7032318115234
  } ],
  "status" : "OK" }
  }
  ]
}
```

The example test script is an example of test script 226 and has two members. The first member is the "GET" element. The value is the URL of the specific REST API resource or service, which in this example case is the Google elevation API with a "locations" query parameter that contains the latitude and longitude parameters.

The second member of this script is an "assert" element. Its value is a JSON array of assertions. Assertions are programming logic expressions that provide a testable mechanism that is either true or false. If the assertion is true, the test is successful. Thus, assertions specify a condition that is expected to be true. This example contains two assertions. The first is a "status" assertion. This assertion has the form {"status": 200}. This assertion is true if the REST API returned an HTTP response code of 200. The value of 200 indicates a successful API operation.

The second assertion is a "json" assertion. The "json" assertion has a value which is a JSON object or a JSON array. In this example, the value is a JSON object that encodes the expected result. The assertion is true (e.g., succeeds) if the output of the REST API is a JSON document that is structurally equivalent to the expected JSON. Because test script 226 may be structured as a JSON document, test script 226 can express any valid JSON value in a "json" assertion.

The test script below is a second example of test script 226 that includes an array of eight script objects where the identifiers in italics (e.g., First script object) are not part of the test script, but are labels for reference.

```
[
  { First script object
  "name" : "default environment",
  "env" : {
    "asignee" : "sasdjb",
    "creator" : "sasdjb",
    "who"     : "{user.name}",
    "commenter" : "resttest",
    "host" : "jiradev.sas.com",
    "rndjira" : "https://{host}/rest/api/2",
    "issue" : "RESTTEST-1"
    }
  },
  { Second script object
  "name" : "jira.template",
  "preconditions" : [
    { "basicAuth" : true }
    ]
  },
  { Third script object
  "name" : "Get JIRA ticket details",
  "template" : "jira.template",
  "GET" : "{rndjira}/issue/{issue}?fields=creator,assignee",
  "bind" : { "json" : "response" },
  "assert" : [
    "response != null",
    "response.key.textValue( ) == issue",
    "response.get('fields').creator.name.textValue( ) == creator",
    "response.get('fields').assignee.name.textValue( ) == asignee"
    ]
  },
  { Fourth script object
  "name" : "Add comment to existing ticket",
  "env" : { "comment" : "This is the text of a comment posted by user {who}" },
  "template" : "jira.template",
  "POST" : "{rndjira}/issue/{issue}/comment",
  "headers" : { "Content-Type" : "application/json" },
  "body" : { "json" : { "body" : "{comment}" } },
  "bind" : { "headers" : { "location" : "Location" } }
  },
  { Fifth script object
  "name" : "Check that the comment was created, echo it to stdout",
  "template" : "jira.template",
  "GET" : "{location}",
  "headers" : { "Accept" : "application/json" },
  "bind" : { "json" : "originalComment" },
  "assert" : [
    "originalComment.body.textValue( ) == comment",
    "originalComment.author.name.textValue( ) == commenter"
    ]
  },
  { Sixth script object
  "name" : "Update the comment",
  "env" : { "newComment" : "This is the updated content of the new comment, updated by user {who}" },
  "template" : "jira.template",
  "PUT" : "{location}",
  "headers" : { "Content-Type" : "application/json" },
  "body" : { "json" : { "body" : "{newComment}" } }
  },
  { Seventh script object
  "name" : "Check that the comment was updated",
  "template" : "jira.template",
  "GET" : "{location}",
  "headers" : { "Accept" : "application/json" },
  "bind" : { "json" : "updatedComment" },
  "assert" : [
    "updatedComment.body.textValue( ) == newComment",
    "updatedComment.author.name.textValue( ) == commenter",
    "updatedComment.updateAuthor.name.textValue( ) == commenter"
    ]
  },
  { Eighth script object
  "name" : "Delete the new comment",
  "ignore" : {
    "template" : "jira.template",
    "DELETE" : "{location}"
    }
  }
]
```

The test script above is built as a JSON array of nested scripts. The square brackets [ ] define the array. The elements of the array are JSON objects, each enclosed in curly braces { }.

The first script object, named "default environment" using the "name" key performs a one-time assignment of reusable variables by assigning the variables using the "env" key. The environment variables are assigned using a JSON array of key/value pairs. For example, ""host": "jiradev.sas.com"" creates a variable named host and assigns it the value jiradev.sas.com. A variable is referenced in string literals by citing its name within curly braces, in the form {varName}. The notation {varName} is used in JSON strings in script objects to indicate variable substitution: the value of the named variable is substituted whenever a variable is named within braces. Thus {host} expands to the value of the host variable, the text string jiradev.sas.com). For example, when assigning the value of the rndjira variable ("rndjira": "https://{host}/rest/api/2"), the value https://jiradev.sas.com/rest/api/2 results.

The second script object, named "jira.template" using the "name" key defines a template or a reusable script that can be included by other scripts so that common elements for executing scripts do not have to be repeated. Templates support reuse of validation scripts. The second script object inherits the constructs in the template, including environment variable assignment, preconditions and assertions, HTTP methods and URIs, headers, and constructs to extract data from the REST call results. Any script object that has the top level construct, "template": "jira.template", inherits the precondition from that template. That is, the script objects that use this template use "basic authentication" when invoking the REST API calls. Templates can themselves include "template" constructs supporting a hierarchy of reusable constructs. Templates are not executed. Rather, they define reusable validation elements that other scripts can inherit. The second script object contains a precondition that defines the REST API authentication. In this case, the JIRA REST API uses "HTTP Basic Authentication". The credentials may be stored in a secured file, not in the publicly viewable script.

The third script object, named "Get JIRA ticket details" using the "name" key invokes the REST API for JIRA, an issue tracking service. The third script object invokes the JIRA API to GET a specific issue from JIRA using a specific issue id by applying the HTTP GET verb to the URL https://jiradev.sas.com/rest/api/2/issue/RESTTEST-1 ?fields=creator,assignee, which is the result of expanding the variables in the URL string.

The "bind" element of the script allows binding values to new variables. It is defined as one or more JSON elements with parameters. In this example, {"json": "response" } will capture the REST API response body, validate that it is a valid JSON response, and bind the variable "response" to the resulting parsed JSON data structure. The "bind" constructs included in Table II may be supported:

TABLE II

| | |
|---|---|
| { "json" : "var" } | parses the REST call response body as JSON and binds the resulting JSON object or array to a variable named "var" |
| { "json" : "@fileName" } | parses the REST call response body as JSON and saves the resulting JSON object or array to a file named filename. If fileName is "-", the JSON is written to the standard output stream |
| { "text" : "var" } | parses the REST call response body as UTF-8 text and binds the resulting text string to a variable named "var" |
| { "text" : "@fileName" } | parses the REST call response body as UTF-8 text and saves the resulting text to a file named fileName. If fileName is "-", the text is written to the standard output stream |
| { "binary" : "var" } | converts the REST call response body to a JSON array of bytes |
| { "binary" : "@fileName" } | writes the REST call response body to the file named by filename as binary bytes. |
| { "headers" : {<br>"var$_1$" : "Header-Name$_1$",<br>"var$_2$" : "Header-Name$_2$" ,<br>...<br>"var$_n$" : "Header-Name$_n$" }<br>} | extracts the values of one or more HTTP response headers and assigns them to environment variables. In addition to specifying a header name, an array in the form [ "Header-Name", pattern, name1, ... , namen ] may be used to bind the value of the header, apply a regular expression pattern to the value, and extract regular expression group values and bind them to variables |
| { "pattern" : [<br>string,<br>pattern,<br>var$_1$,<br>...,<br>var$_n$ ] } | matches a string value against a regular expression pattern and binds variables based on the regular expression groups. For example,<br>{ "pattern" : [ "{responseType}",<br>" (.*)\\s*;\\s*charset=(.*)$",<br>"mediaType",<br>"charset" ] }<br>matches the value of the environment expansion of "{responseType}" to the given regular expression pattern<br>^(.*)\s*;\s*charset=(.*)$, and binds the media type and the encoding character set substrings to the variables mediaType and charset. (Note that based on the JSON grammar, backslash (\) characters in a JSON string are escaped, so the regular expression notation \s*, which matches optional whitespace, may be coded in the JSON string as \\s*.) If the responseType binding in the environment is application/json; charset=UTF-8, the pattern specification binds the variables: mediaType to "application/json", and charset to "UTF-8" |
| { "groovy" : { "var1" : "expression1",<br>"var2" : "expression2", ..., "varn" : "expressionn" } } | evaluates each expression string as a "Groovy" expression and binds the result to the corresponding script variable. |

The third script object also includes assertions that test the result of the API by processing the JSON output. The "assert" element provides one or more validation assertions, which are constructs that when true the test succeeds. The first assertion "response!=null" validates that the value of response, as bound by the preceding "bind" element, is not the null value. The assertion "response.key.textValue( )==issue" tests that the JSON response (bound from the preceding "bind" element) contains a member with the name "key" and that its string value is identical to the variable named issue. Validations are performed by executing the assertion as a Boolean expression using the Groovy language. Variables bound in the script object are also available as local variables when the Groovy expression is interpreted by the Groovy runtime. In addition to Groovy Boolean expression assertions, the following test types are supported:

Equality tests for string, numeric, and JSON values. When testing numeric values, an optional epsilon value can be supplied, allowing inexact comparisons to account for imprecise floating point values;

Regular expression pattern matching;

JSON response body matching a JSON expected value;

Text response body matching a text expected value; and

REST API call's HTTP status code matches a specific numeric value, one of an array of values, or a regular expression.

The fourth script object, named "Add comment to existing ticket" using the "name" key uses an HTTP POST operation to create a new comment on an existing JIRA ticket, which is a feature of the JIRA REST API. The text of the comment is assigned to the variable named comment in the current environment to facilitate asserting that the comment was added later. The value of the "who" variable assigned in the first script object is inserted into the comment string. The fourth script object uses the "jira.template" template previously parsed as the second script object, which provides "Basic Authentication" for the API call. The POST adds the comment to the issue identified by the variable "issue", which is inserted into the target URL. The body of the POST request is a JSON object and takes the form {"body": "This is the text of a comment posted by user {who}"}. The fourth script object also specifies an HTTP request header. The Content-Type header is set to the value "application/json" that indicates that the request body is JSON. After the API call completes, the "Location" header script object also validates additional attributes of the request, such as the userid of the commenter and the userid of the user that updated the comment.

The eighth script object, named "Delete the new comment" using the "name" key uses HTTP DELETE to delete the comment.

The "assert" constructs included in Table III may be supported:

TABLE III

| | |
|---|---|
| { "status" : integer } <br> { "status" : integer-array } <br> { "status" : pattern } | asserts that the HTTP status code of a REST API call is a specific value, or is one of the values in an array of acceptable values, or that the status code matches a regular expression such as "2.." (meaning, any successful call) |
| { "json" : json-object-or-array } <br> { "json" : "@file-or-url" } | asserts that the response body of a REST CALL is valid JSON and that it matches the structure of an inline JSON object or array, or that it matches the JSON stored in an external file or at a URL |
| { "text" : "expected text" } <br> { "text" : "@file-or-url" } <br> { "text" : array-of-strings } | asserts that the response body matches some text exactly. |
| { "binary" : [ array-of-byte-values] } <br> { "text" : "@file-or-url" } | Asserts that the response body matches some binary content exactly. |
| { "bound" : "var-name" } <br> { "bound" : [ "var-name1", ..., "var-namen" ] } | asserts that one or more environment variables are bound. This is often useful in a precondition and in templates in cases where such templates require certain variables to be bound |
| { "headers" : [ <br>　{ headerName : "pattern" }, <br>　... <br>　{ headerName : "pattern" }　]　}, | asserts that one or more of the HTTP response headers exist and match a regular expression pattern |
| { "groovy" : groovy-script } <br> { "groovy" : [ <br>　groovy-script, <br>　..., <br>　groovy-script <br> ] } | executes each groovy-script (a String) as an expression using the Groovy runtime. All the variables defined in the environment are also bound in the Groovy runtime environment. If the expression returns a true value, the assertion passes, else it fails. In addition, any string values within an "assert" or "preconditions" construct are evaluated as Groovy assertions. |
| { "equal" : [ lhs, rhs ] } <br> { "equal" : [ lhs, rhs, epsilon ] } | asserts that two values are equal. In the second case, the values are interpreted as floating point values, and they must be equal within an epsilon value. That is, \|lhs − rhs\| < epsilon |
| { "ignore" : any-value-json } | ignores the content making it useful for ignoring an assertion and provides a means to add documentation to an script object | is extracted from the response headers and stored in the environment variable "location".

The fifth script object, named "Check that the comment was created, echo it to stdout" using the "name" key performs a GET on the location URL created by the previous script to validate that the new comment resource exists.

The sixth script object, named "Update the comment" using the "name" key performs an HTTP PUT of the comment to change the comment text. The sixth script object updates the comment with new text, demonstrating how the PUT HTTP verb is used. The location from the POST is used to identify the location of the comment resource that the POST created.

The seventh script object, named "Check that the comment was updated" using the "name" key performs another HTTP GET to validate that the comment has been changed. The seventh script object compares the actual comment received from the REST API call to the value of the newComment variable in the environment. The seventh The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   read a first key and a first value associated with the first key from a test script containing a script, wherein the first key and the first value are separated by a colon and the first key is included in first double quotes and the first value is included in second double quotes to form a first JavaScript Object Notation (JSON) name/value pair;
   determine whether the first key matches a plurality of keys defined for an application programming interface (API) call;
   based on the first key matching the plurality of keys defined for the API call, configure the API call using the first key and the first value and removing the colon, the first double quotes, and the second double quotes;
   execute the configured API call;
   receive a response value from the executed API call;
   read a second key and a second value associated with the second key from the test script, wherein the second key and the second value are separated by a second colon and the second key is included in third double quotes to form a second JSON name/value pair; and
   based on the second key matching an assert key,
      parse the second value into a third key and a third value, wherein the third value defines an expected response to the API call, wherein the third value is a third JSON name/value pair;
      map the second key and the third key to an implementation class of a programming language, wherein the implementation class tests whether an assertion is true or false;
      instantiate the implementation class;
      call a method of the instantiated implementation class, wherein the third value is passed as an input to the method, wherein the method compares the third value with the received response value;
      receive an assertion result indicator from the called method; and
      indicate a success or a failure of the API call based on the received assertion result indicator.

2. The computer-readable medium of claim 1, wherein the first key indicates a hypertext transfer protocol verb.

3. The computer-readable medium of claim 1, wherein the test script includes a plurality of scripts, wherein each script of the plurality of scripts starts with a left curly brace and ends with a right curly brace to form a JSON object.

4. The computer-readable medium of claim 1, wherein the computer-readable instructions further cause the computing device to:
   read a fourth key and a fourth value associated with the fourth key from the test script,
   wherein the fourth key and the fourth value are separated by a third colon and the fourth key is included in fourth double quotes.

5. The computer-readable medium of claim 4, wherein the fourth value is included in fifth double quotes,
   wherein the fourth value indicates a name of a second script included in the test script to merge into the script.

6. The computer-readable medium of claim 4, wherein the fourth value is a key-value pair that forms a fourth JSON name/value pair,
   wherein the key-value pair includes a fifth key and a fifth value separated by a fourth colon and the fifth key is included in fifth double quotes and the fifth value is included in sixth double quotes.

7. The computer-readable medium of claim 4, wherein the fourth value is an array of key-value pairs,
   wherein each key-value pair of the array of key-value pairs includes a fifth key and a fifth value separated by a fourth colon and the fifth key is included in fifth double quotes.

8. The computer-readable medium of claim 4, wherein the fourth value is a plurality of key-value pairs,
   wherein each key-value pair of the plurality of key-value pairs includes a fifth key and a fifth value separated by a fourth colon and the fifth key is included in fifth double quotes and the fifth value is included in sixth double quotes.

9. The computer-readable medium of claim 4, wherein the fourth value is a key-value pair,
   wherein the key-value pair includes a fifth key and a fifth value separated by a fourth colon and the fifth key is included in fifth double quotes and the fifth value is a second key-value pair,
   wherein the second key-value pair includes a sixth key and a sixth value separated by a fifth colon and the sixth key is included in sixth double quotes and the sixth value is included in seventh double quotes.

10. The computer-readable medium of claim 4, wherein the fourth value includes a plurality of values with each value of the plurality of values included in fifth double quotes.

11. The computer-readable medium of claim 4, wherein the computer-readable instructions further cause the computing device to:
    based on the fourth key matching a template key,
       identify a second script in the test script by matching the fourth value to a script name assigned to the second script using a name key; and
       include the identified second script in the script.

12. The computer-readable medium of claim 4, wherein the computer-readable instructions further cause the computing device to:
    based on the fourth key matching an environment key,
       parse the fourth value into a fifth key and a fifth value;
       create a variable named using the fifth key; and
       assign a variable value to the created variable using the fifth value.

13. The computer-readable medium of claim 1, wherein the test script includes a plurality of scripts and the computer-readable instructions further cause the computing device to:
    read a string from the script;
    identify a second script from the plurality of scripts by matching the read string to a name of the second script; and
    execute the identified second script.

14. The computer-readable medium of claim 1, wherein the test script includes a plurality of scripts and the computer-readable instructions further cause the computing device to:

read a string from the script;
determine that the read string indicates a name of a file that includes a second script;
open the file using the indicated name; and
parse the second script by reading the open file.

15. The computer-readable medium of claim 1, wherein the test script includes a plurality of scripts and the computer-readable instructions further cause the computing device to:
read a string from the script;
determine that the read string indicates a name of a uniform resource identifier (URI) that includes a second script; and
parse the second script by accessing the URI.

16. A computing device comprising:
a processor; and
a computer-readable medium operably coupled to the processor, the computer-readable medium having computer-readable instructions stored thereon that, when executed by the processor, cause the computing device to
read a first key and a first value associated with the first key from a test script containing a script, wherein the first key and the first value are separated by a colon and the first key is included in first double quotes and the first value is included in second double quotes to form a first JavaScript Object Notation (JSON) name/value pair;
determine whether the first key matches a plurality of keys defined for an application programming interface (API) call;
based on the first key matching the plurality of keys defined for the API call, configure the API call using the first key and the first value and removing the colon, the first double quotes, and the second double quotes;
execute the configured API call;
receive a response value from the executed API call;
read a second key and a second value associated with the second key from the test script, wherein the second key and the second value are separated by a second colon and the second key is included in third double quotes to form a second JSON name/value pair; and
based on the second key matching an assert key,
parse the second value into a third key and a third value, wherein the third value defines an expected response to the API call, wherein the third value is a third JSON name/value pair;
map the second key and the third key to an implementation class of a programming language, wherein the implementation class tests whether an assertion is true or false;
instantiate the implementation class;
call a method of the instantiated implementation class, wherein the third value is passed as an input to the method, wherein the method compares the third value with the received response value;
receive an assertion result indicator from the called method; and
indicate a success or a failure of the API call based on the received assertion result indicator.

17. The computing device of claim 16, wherein the first key indicates a hypertext transfer protocol verb.

18. The computing device of claim 16, wherein the computer-readable instructions further cause the computing device to:
read a fourth key and a fourth value associated with the fourth key from the test script,
wherein the fourth key and the fourth value are separated by a third colon and the fourth key is included in fourth double quotes.

19. The computing device of claim 18, wherein the computer-readable instructions further cause the computing device to:
based on the fourth key matching a template key,
identify a second script in the test script by matching the fourth value to a script name assigned to the second script using a name key; and
include the identified second script in the script.

20. The computing device of claim 18, wherein the second value is a key-value pair that forms a fourth JSON name/value pair,
wherein the key-value pair includes a fifth key and a fifth value separated by a fourth colon and the fifth key is included in fifth double quotes and the fifth value is included in sixth double quotes.

21. The computing device of claim 18, wherein the fourth value is an array of key-value pairs,
wherein each key-value pair of the array of key-value pairs includes a fifth key and a fifth value separated by a fourth colon and the fifth key is included in fifth double quotes.

22. The computing device of claim 18, wherein the fourth value is a plurality of key-value pairs,
wherein each key-value pair of the plurality of key-value pairs includes a fifth key and a fifth value separated by a fourth colon and the fifth key is included in fifth double quotes and the fifth value is included in sixth double quotes.

23. The computing device of claim 18, wherein the fourth value is a key-value pair,
wherein the key-value pair includes a fifth key and a fifth value separated by a fourth colon and the fifth key is included in fifth double quotes and the fifth value is a second key-value pair,
wherein the second key-value pair includes a sixth key and a sixth value separated by a fifth colon and the sixth key is included in sixth double quotes and the sixth value is included in seventh double quotes.

24. The computing device of claim 18, wherein the fourth value includes a plurality of values with each value of the plurality of values included in fifth double quotes.

25. The computing device of claim 18, wherein the computer-readable instructions further cause the computing device to:
based on the fourth key matching an environment key,
parse the fourth value into a fifth key and a fifth value;
create a variable named using the fifth key; and
assign a variable value to the created variable using the fifth value.

26. The computing device of claim 16, wherein the test script includes a plurality of scripts and the computer-readable instructions further cause the computing device to:
read a string from the script;
determine that the read string indicates a name of a uniform resource identifier (URI) that includes a second script; and
parse the second script by accessing the URI.

27. The computing device of claim 16, wherein the test script includes a plurality of scripts and the computer-readable instructions further cause the computing device to:
read a string from the script;

determine that the read string indicates a name of a file that includes a second script;
open the file using the indicated name; and
parse the second script by reading the open file.

28. A method of validating an application programming interface call, the method comprising:
reading, by a computing device, a first key and a first value associated with the first key from a test script containing a script, wherein the first key and the first value are separated by a colon and the first key is included in first double quotes and the first value is included in second double quotes to form a first JavaScript Object Notation (JSON) name/value pair;
determining, by the computing device, whether the first key matches a plurality of keys defined for an application programming interface (API) call;
based on the first key matching the plurality of keys defined for the API call, configuring, by the computing device, the API call using the first key and the first value and removing the colon, the first double quotes, and the second double quotes;
executing, by the computing device, the configured API call;
receiving, by the computing device, a response value from the executed API call;
reading, by the computing device, a second key and a second value associated with the second key from the test script, wherein the second key and the second value are separated by a second colon and the second key is included in third double quotes to form a second JSON name/value pair; and
based on the second key matching an assert key,
parsing, by the computing device, the second value into a third key and a third value, wherein the third value defines an expected response to the API call, wherein the third value is a third JSON name/value pair;
mapping, by the computing device, the second key and the third key to an implementation class of a programming language, wherein the implementation class tests whether an assertion is true or false;
instantiating, by the computing device, the implementation class;
calling, by the computing device, a method of the instantiated implementation class, wherein the third value is passed as an input to the method, wherein the method compares the third value with the received response value;
receiving, by the computing device, an assertion result indicator from the called method; and
indicating, by the computing device, a success or a failure of the API call based on the received assertion result indicator.

29. The method of claim 28, wherein the first key indicates a hypertext transfer protocol verb.

30. The method of claim 28, wherein the test script includes a plurality of scripts, wherein each script of the plurality of scripts starts with a left curly brace and ends with a right curly brace to form a JSON object.

* * * * *